United States Patent

Maruyama et al.

[11] Patent Number: 5,571,264
[45] Date of Patent: Nov. 5, 1996

[54] FLUID SEALED TYPE ANTIVIBRATION RUBBER DEVICE

[75] Inventors: Osamu Maruyama; Kazutoshi Satori, both of Saitama, Japan

[73] Assignee: Yamashita Rubber Kabushiki Kaisha, Saitama, Japan

[21] Appl. No.: 490,539

[22] Filed: Jun. 14, 1995

[30] Foreign Application Priority Data

Jun. 28, 1994 [JP] Japan .................................. 6-168946
Apr. 26, 1995 [JP] Japan .................................. 7-102576

[51] Int. Cl.$^6$ ................................................ F16F 11/00
[52] U.S. Cl. ................................................ 267/140.14
[58] Field of Search ........................ 267/140.13, 140.14,
267/140.15, 219; 188/299; 180/291, 300,
312, 902; 248/562, 636

[56] References Cited

U.S. PATENT DOCUMENTS

| | | |
|---|---|---|
| 4,610,421 | 9/1986 | Ohta et al. . |
| 4,648,576 | 3/1987 | Matsui . |
| 4,660,812 | 4/1987 | Dan et al. . |
| 4,709,779 | 12/1987 | Takehara . |
| 4,802,648 | 2/1989 | Decker et al. . |
| 4,872,652 | 10/1989 | Rohner et al. . |
| 4,877,225 | 10/1989 | Noguchi et al. ................ 267/140.14 |
| 4,886,252 | 12/1989 | Häussermann . |
| 5,167,403 | 12/1992 | Muramatsu et al. ............. 267/140.13 |
| 5,180,148 | 1/1993 | Muramatsu . |
| 5,205,546 | 4/1993 | Schisler et al. . |
| 5,217,211 | 6/1993 | Ide et al. . |
| 5,246,213 | 9/1993 | Zup et al. ....................... 267/140.14 |
| 5,370,375 | 12/1994 | Kojima ............................ 267/140.14 |
| 5,393,041 | 2/1995 | Takano et al. .................. 267/140.14 |

FOREIGN PATENT DOCUMENTS 3-46035  4/1991  Japan .
5-172180  7/1993  Japan .

*Primary Examiner*—Lee W. Young
*Attorney, Agent, or Firm*—Birch, Stewart, Kolasch & Birch, LLP

[57] ABSTRACT

A first connecting member 1 secured to an engine, a second connecting member connected to an automobile vehicle and a rubber block 3 of a cylindrical shape for connecting the first and second connecting members are provided. The rubber block 3 is divided by a partition wall 6 into a first chamber 8 and a second chamber 9 and an orifice passage 34 is disposed to communicate with both chambers. The orifice passage 34 and the first chamber 8 are adapted to communicate with each other by an intermediate opening portion 37 which is opened and closed by a passage length adjustable valve 38 and passage end opening portions which are always open. The rubber block 3 has a cylindrical portion 5, the wall of which serves at a part thereof as a movable wall portion 12. When a control chamber 26 provided on the periphery is kept under negative pressure, the internal pressure of the first chamber 8 is lowered and the passage length adjustable valve 38 integrally formed with the movable wall portion 12 starts its displacement to open the intermediate opening portion 37, wherein the orifice length is shortened. Thus, it is possible to set a dynamic spring minimum value in an idling vibration range and remarkably reduce the dynamic spring rate.

11 Claims, 11 Drawing Sheets

NEGATIVE PRESSURE SOURCE

FLUID SEALED TYPE ANTIVIBRATION RUBBER DEVICE

BACKGROUND OF THE INVENTION

1. Field of the Invention

This invention relates to a fluid sealed type antivibration rubber device such as a suspension mount rubber and an engine mount rubber of an automobile vehicle which controls the internal pressure by an external means.

2. Description of the Background Art

Such a fluid sealed type antivibration rubber device is known and disclosed for example in Japanese Laid-Open Utility Model Publication (Kokai) No. Hei 3-46035 in which a rotating member is provided in a fluid chamber and the internal pressure therein is mechanically controlled by rotating the rotating member. Another approach is disclosed in Japanese Laid-Open Patent Publication (Kokai) No. Hei 5-172180 in which the internal pressure is electrically controlled by vibrating a vibrating portion such as bellows which are electromagnetically driven.

In the mechanically controlled fluid sealed type antivibration rubber device using the rotating member, disadvantages may be found in that the construction becomes complicated, many numbers of parts are necessary and the change of performance during use is quite big because it is difficult to secure both the durability and the sealing in a rotating portion of the rotating member.

On the other hand, the electrically controlled fluid sealed type antivibration rubber device has also the disadvantages that the construction becomes complicated, many numbers of parts are necessary, and it is difficult to ensure the performance because the performance of magnetic fluid used as working fluid varies with a change in temperature and the working fluid changes with the passage of time.

In addition, since the periphery of the vibrating portion such as the bellows is immersed in the working fluid, the fluid resistance resulting from the vibration of the vibrating portion increases and as a result, the consumption amount of the necessary driving electric power increases and the sealing is also difficult.

Further, such a fluid sealed type antivibration rubber device is generally required to exhibit vibration-damping in a low frequency range of 9~15 Hz, to exhibit an extreme low dynamic spring rate in idling vibrations of an engine in a frequency range of 20~30 Hz and also to exhibit a moderate low dynamic spring rate for the principal frequency vibrations of higher than 30 Hz during running of the automobile vehicle at a constant speed. Thus, the fluid sealed type antivibration rubber device is required to selectively find the most suitable control depending upon such actual running conditions of the vehicle as stated above.

It is therefore an object of the present invention to provide an improved fluid sealed type antivibration rubber device which can overcome all of such drawbacks as found in the prior art.

SUMMARY OF THE INVENTION

In order to solve the problems described above, according to the present invention, there is provided a fluid sealed type antivibration rubber device comprising a first connecting member secured to one side of either a vehicle body or a vibrating member, a second connecting member secured to the other side of a vehicle body or a vibrating member, a rubber block disposed between the first and second connecting members, the first and second connecting members forming a closed space therebetween with at least a part of the rubber block, a partition member dividing the closed space into a plurality of fluid chambers, and an orifice passage provided to put the plurality of fluid chambers in communication with each other, wherein the first or second connecting member forming the fluid chambers has a wall portion, the inside of which is covered by a rubber wall which is a part continuing from the rubber block, the wall portion of the first or second connecting member covered by the rubber wall being provided at a part thereof with an opening portion, and a part of the rubber wall corresponding to the opening portion is adapted to serve as a movable wall portion which is elastically deformable from the opening portion toward the outside, the elastic deformation being arranged such that its displacement is controlled by a control means provided outside the device, and wherein the partition member on the side of the fluid chamber facing the movable wall portion is provided at its surface with a first opening portion which is always open as an opening portion for the orifice passage and a second opening portion which is opened and closed by a passage length adjustable valve, the passage length adjustable valve being arranged to project from the movable wall portion toward the center of the partition member so that it can slide on the surface of the partition member, whereby the orifice length is adjustably controlled such that when the second opening portion is closed, the orifice passage lengthens and when the second opening portion is opened, the orifice passage shortens.

The orifice passage may be composed of a single passage or a plurality of passages more than two. When it is composed of a single passage, it is preferable that a pair of passage end opening portions is provided which always make both ends of the orifice passage open to put the fluid chambers in communication with each other and an intermediate opening portion which is open in the middle of the orifice passage to communicate with one fluid chamber, wherein the displacement of the movable wall portion allows the passage length adjustable valve to open and close the intermediate opening portion to adjust the orifice passage.

In this case, the means for controlling the passage length adjustable valve may be an external air control device which is adapted to control the displacement of the movable wall portion by negative pressure from the outside.

The outside of the movable wall portion may be covered by a rigid case member and the movable wall portion may be provided at a part thereof with a thick deformation control portion which projects toward the case member.

The passage length adjustable valve may also be provided with a projection which is adapted to engage with the intermediate opening portion when the valve is closed and to mount an opening edge of the intermediate opening portion when the valve is opened, thereby lifting the valve up to keep it apart from the partition member. The projection may be formed with a slope.

When the orifice passage is desired to be composed of a plurality of passages, at least one damping orifice which always puts the fluid chambers into communication with each other and an idling orifice is provided which is shorter than the damping orifice and the inlet or outlet of which is opened or closed by the passage length adjustable valve integrally formed with the movable wall portion when displaced to be capable of effecting communication or stopping communication with each fluid chamber.

To provide a comfortable drive in the vibrations in a low frequency range of 9~15 Hz, the movable wall portion is left free and the second opening portion is closed by the passage length adjustable valve. Thus, since the substantial orifice length lengthens and the internal pressure within the fluid chamber is partly absorbed depending on the elastic deformation of the movable wall portion itself, it is possible to generate fluid resonance from the low-frequency vibrations of 9–15 Hz and obtain in this frequency range effective vibration-damping characteristics.

In idling vibrations of an engine in a frequency range of 20–30 Hz, when the displacement of the movable wall portion is controlled by negative pressure and the like to open the passage length adjustable valve, the second opening portion communicates with the fluid chamber to shorten the substantial orifice length. It is therefore possible to set the minimum value of a dynamic spring rate in this frequency range and remarkably reduce the dynamic spring rate.

Further, when the vehicle is running at a constant speed, the displacement of the movable wall portion is not controlled and the second opening portion is closed by the passage length adjustable valve to lengthen the substantial orifice length. Thus, since fluid resonance is generated in high-frequency vibrations of higher than 30 Hz and the movable wall portion is comparatively freely deformable, the internal pressure generated by the engine vibration is partially absorbed by the movable wall portion and as a result, the low dynamic spring condition can be realized.

The movable wall portion may be integrally formed with the rubber block and the displacement of the movable wall portion is controlled by the control means which is provided outside the fluid chamber, while the passage length adjustable valve may also be integrally formed with the movable wall portion. In this case, since the working fluid within the fluid chamber only contacts with the movable wall portion, it is not necessary to provide a special sealing therebetween.

Mechanically slidable portions, which are easily worn away, may not be provided herein. Also, since any special magnetic fluid is not used here as the working fluid, it is possible to minimize a possible property change of the working fluid resulting from an environmental change for its use such as a temperature, thereby securing the property assurance of the working fluid.

A fluid resistance generating when the movable wall portion is displaced becomes small to facilitate the control of its displacement by the negative pressure. This method consumes less electricity than that of the control of the movable wall portion by an electric means such as a solenoid. Thus, since such an internal pressure control mechanism is simplified, it is possible to make the entire mechanism simple. As a result, it is also possible to reduce the number of parts used and the cost therefor.

It is preferable that the outside of the movable wall portion is covered by a rigid case member and the movable wall portion is provided at a part thereof with a thickened portion to serve as a deformation control portion which is adapted to project toward the case member. When the deformation control portion is moved to contact with or separate from the case member, the dynamic spring constant changes and it is possible to exhibit a nonlinear spring characteristic responsive to the magnitude of the input vibrations and improve the durability of the movable wall portion. It is also possible to control the displacement amount when the movable wall portion is displaced.

When the passage length adjustable valve is provided with a projection and it is slidingly moved in parallel with the plane of the partition wall, the projection is driven to mount on the edge portion of the periphery of the intermediate opening portion to keep the passage length adjustable valve apart from the partition wall, thereby assuring the valve opening operation.

In this case, when the projection is provided with a slope, the mounting of the projection on the edge portion is smoothly effected and as a result, the valve opening operation can be effected with less load and it can contribute to a more compact device.

Furthermore, when the intermediate opening portion is provided as the second opening portion in the middle of the orifice passage, the orifice length is adjustable by the opening and closing of the intermediate opening portion and in this case, it is not necessary to provide a plurality of orifice passages.

However, when a plurality of orifice passages are provided in the fluid sealed type antivibration rubber device, it is possible to increase the degree of freedom in design of natural resonance frequency to the input vibrations to easily meet various demands for damping the frequency vibrations.

The above and other objects, features, and advantages of the invention will become more apparent from the following description of the preferred embodiments when taken in conjunction with the accompanying drawings.

DETAILED DESCRIPTION OF THE PREFERRED EMBODIMENT

A first embodiment of an engine mount of the present invention will be described with reference to FIGS. 1 through 4. FIG. 2 is a plan view of the engine mount and FIG. 1 is a cross-sectional view taken along line 1—1 of FIG. 2 in which the engine mount is cut in a plane parallel to a main input direction Z of vibrations to be insulated.

Figure 1:
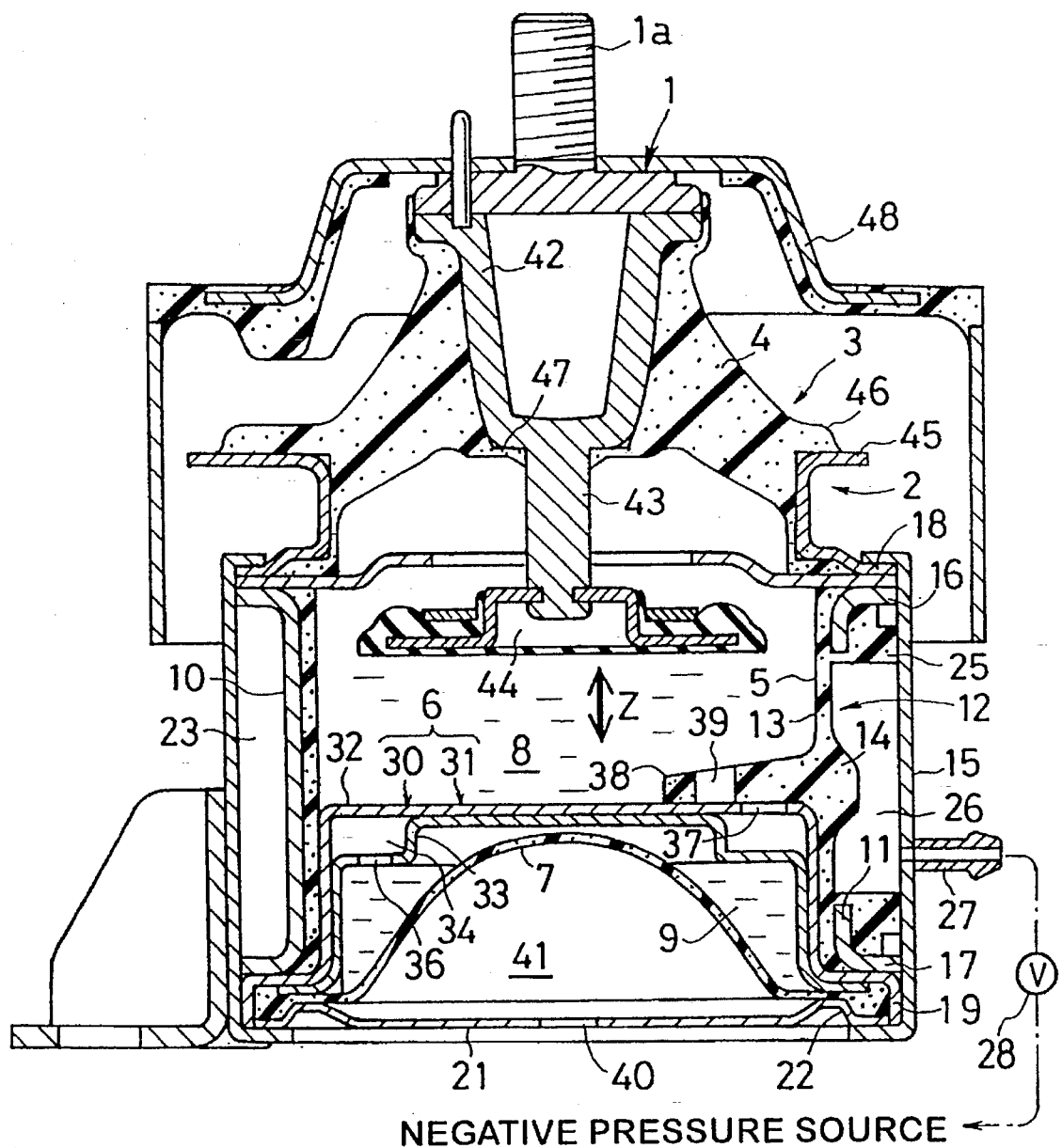
FIG. 1 is an enlarged sectional view taken along line 1—1 of FIG. 2.
Figure 2:
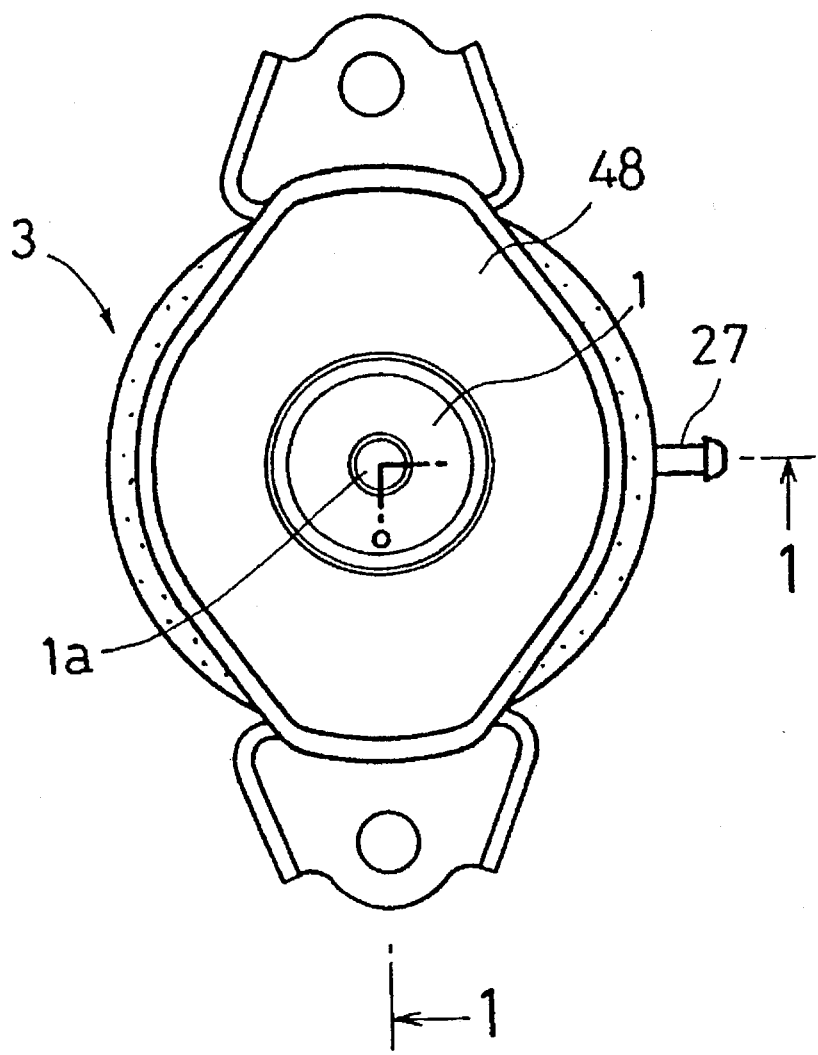
FIG. 2 is a plan view of an engine mount according to a first embodiment.

Referring first to FIG. 1, there is illustrated an engine mount comprising a first connecting member 1 secured by a bolt 1a to an engine which is a side generating vibrations, a second connecting member 2 connected to an automobile body, and a rubber block 3 provided at its one end with a cylindrical block body portion 4 of a generally truncated cone shape which is adapted to connect the first connecting member I and the second connecting member 2. However, the connecting relation between the engine and the body may be reversed.

A portion integrally extending from the block body portion 4 of the rubber block 3 forms a thin cylindrical portion 5, the open end of which is provided with a diaphragm 7 through a partition wall 6. An inner space surrounded by the rubber block 3 and the diaphragm 7 forms a fluid chamber which is divided by the partition wall 6 into a first chamber 8 and a second chamber 9.

The outside of the cylindrical portion 5 is supported by a case inner member 10 made of metal which is formed at a part thereof with a hole portion 11. A portion of the cylindrical portion 5 facing the hole portion 11 is adapted to serve as a movable wall portion 12. The movable wall portion 12 is provided with a thin portion 13 and a thick deformation control portion 14. The outer end of the deformation control portion 14 projects within the hole portion 11 to come close to a case outer member 15 which is provided, with a space left, at the periphery of the partition wall 6 like a double wall.

The case inner member 10 is provided at both ends with two outer flanges 16 and 17. One outer flange 16 and an outer flange 18 of the second connecting member 2 are overlapped, while the other outer flange 17, an outer flange 19 formed at the open end of the partition wall 6 of a cup shape, a peripheral portion of the diaphragm 7 and an outer flange 22 of a housing 21 are overlapped together so that all of them can be united by clamping both the ends of the case outer member 15.

Within a space 23 between the case inner member 10 and the case outer member 15, there is provided a control chamber 26 surrounded by a sealing wall 25 integrally formed with the movable wall portion 12 to cover the case inner member 10 formed at the periphery of the hole portion 11. A negative pressure pipe 27 is connected at its one end to the control chamber 26 for communication therewith and at its other end to the downstream of a carburetor of an engine (not shown) through a control valve 28 to be capable of applying a depression at the engine manifold to the inside of the control chamber 26. However, the negative pressure source is not limited to the depression at engine manifold and it may be, for example, a vacuum pump or the like.

The control valve 28 is controllably driven by a microcomputer or the like (not shown), wherein there is provided an external air control device for adjusting the air pressure within the control chamber 26 so that the movable wall portion 12 can deform to such an extent that is required. In the present embodiment, when it is not desired to control the displacement of the movable wall portion 12, the control chamber 26 is kept under normal pressure by introducing the atmospheric pressure therein, while the movable wall portion 12 is adapted to go back toward the outside by introducing the negative pressure into the control chamber 26 only when it is desired to control the displacement of the movable wall portion 12.

The partition wall 6 is formed by overlapping a partition outer member 30 and a partition inner member 31 inside and out and there is formed an orifice passage 34 between the outer periphery of a circular plane portion 32 formed on the partition outer member 30 and a step portion 33 formed on the outer periphery of the partition inner member 31 overlapping the former.

Figure 3:
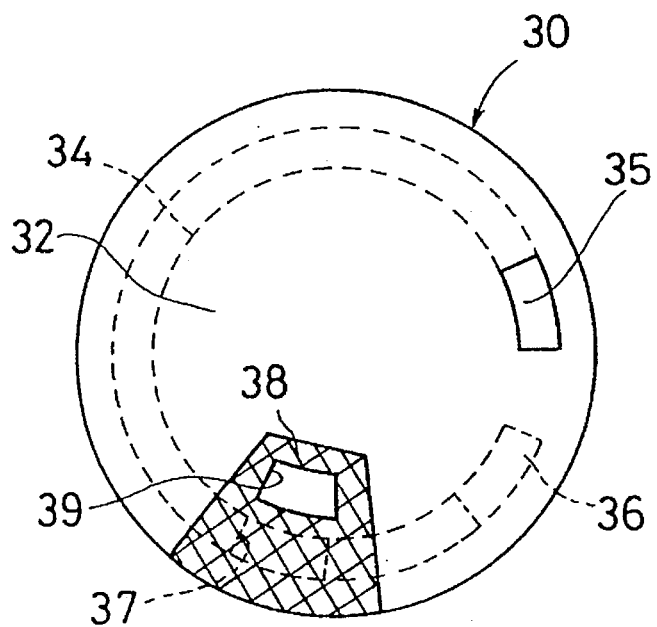
FIG. 3 is a plan view of an essential part of the first embodiment in which a substantial orifice length is at a maximum.

The orifice passage 34 is adapted to communicate with the first chamber 8 and the second chamber 9 and the natural resonance frequency of the first chamber 8 to the input vibrations is determined in accordance with the opening area of the orifice passage 34 and the substantial orifice length. FIG. 3 is a schematic plan view of the partition outer member 30 in which the orifice passage 34 is formed in a circular arc shape along a majority of the outer periphery of the partition outer member 30 and provided at both ends with passage end opening portions 35 and 36.

These openings are always open, wherein the passage end opening portion 35 is open toward the first chamber 8 to communicate therewith, while the passage end opening portion 36 is open toward the second chamber 9 to communicate therewith (see FIG. 1).

As is apparent from FIG. 3, there is formed an intermediate opening portion 37 in a position very close to the passage end opening portion 36 of the orifice passage 34. The intermediate opening portion 37 communicates with the orifice passage 34 and it is also open toward the first chamber 8 to be capable of communicating therewith. However, the intermediate opening portion 37 is adapted to be opened and closed by a passage length adjustable valve 38.

The passage length adjustable valve 38 is integrally formed with the movable wall portion 12 and projects toward the center to be slidable on the partition outer member 30. It is provided with a communication opening 39 which is the opening with a shape corresponding with the intermediate opening portion 37.

The passage length adjustable valve 38 is arranged so that the communication opening 39 is situated, as shown in FIG. 3, in a more inner position than that of the intermediate opening portion 37 in a normal condition that the displacement of the movable wall portion 12 is not controlled, wherein the intermediate opening portion 37 is adapted to be closed by the non-opening portion of the passage length adjustable valve 38. In this case, the substantial orifice length is arranged to have the maximum length connecting between the passage end opening portions 35 and 36.

Figure 4:
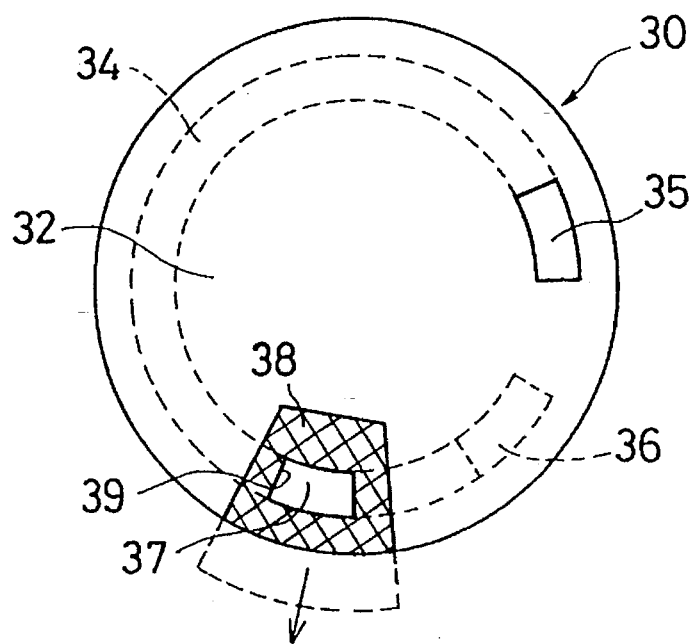
FIG. 4 is a plan view of the essential part of the first embodiment in which the substantial orifice length is at a minimum.

FIG. 4 shows a condition in which the displacement of the movable wall portion 12 is controlled, wherein the passage length adjustable valve 38 is slidably moved on the partition outer member 30 to go back in the radially outward direction, thereby corresponding the communication opening 39 with the intermediate opening portion 37 to open the latter intermediate opening portion 37. In this case, the substantial orifice length is arranged to have the minimum length connecting between the intermediate opening portion 37 and the passage end opening portion 36.

As shown in FIG. 1, the housing 21 is formed at its bottom with a vent 40 which serves to open an air chamber 41 formed between the housing 21 and the diaphragm 7 into the atmosphere, thereby permitting the free deformation of the diaphragm 7 resulting from a flow of the working fluid between the fluid chambers 8 and 9.

Furthermore, the first connecting member 1 is provided with a supporting member 42 passing through an axial portion of the rubber block 3. The supporting member 42 has a neck portion 43 projecting inside the first chamber 8, the top end of which is provided with an orifice plate 44 which has a generally disc shape when seen in plan and forms a narrow path between the inner wall of the block body 4 and the orifice plate 44. The orifice plate 44 is adapted to vibrate with the first connecting member 1 as a unit to cause the liquid level resonance and mainly to absorb the medium to high frequency vibrations.

The second connecting member 2 has an outer flange 18 and a securing flange 45 which is arranged in parallel with the outer flange 18. Mounted on the securing flange 45 is a thick flange portion 46 which is integrally formed with the block body 4 to project to the periphery thereof. The extension of the securing flange 45 intersects a portion sandwiched between the base portion 47 of the neck portion 43 and the orifice plate 44 at the intermediate portion of the neck portion 43. The first connecting member 1 is provided with a bracket 48 for securing the engine mount to the engine side.

The operation of the first embodiment will now be described. In FIG. 1, for example, the first connecting member I is secured to the engine and the securing flange 45 of the second connecting member 2 is secured to the vehicle body. In such a condition, when the air pressure within the control chamber 26 is adjusted, the movable wall portion 12 is displaced to control the internal pressure of the first chamber 8, thereby being capable of controlling vibration-damping characteristics and dynamic spring characteristics as described below.

First, to ensure high comfortability against vibrations in a low-frequency range of 9–15 Hz, the control chamber 26 is kept under normal pressure. In this case, the substantial orifice length is maximized (see FIG. 3). At the same time, since the internal pressure of the first chamber 8 is partially absorbed in response to the elastic deformation of the movable wall portion 12 itself, the resonance point becomes the low-frequency vibration range of 9–15 Hz and it is possible to obtain an effective damping characteristic within this range (see FIG. 5).

Figure 5:
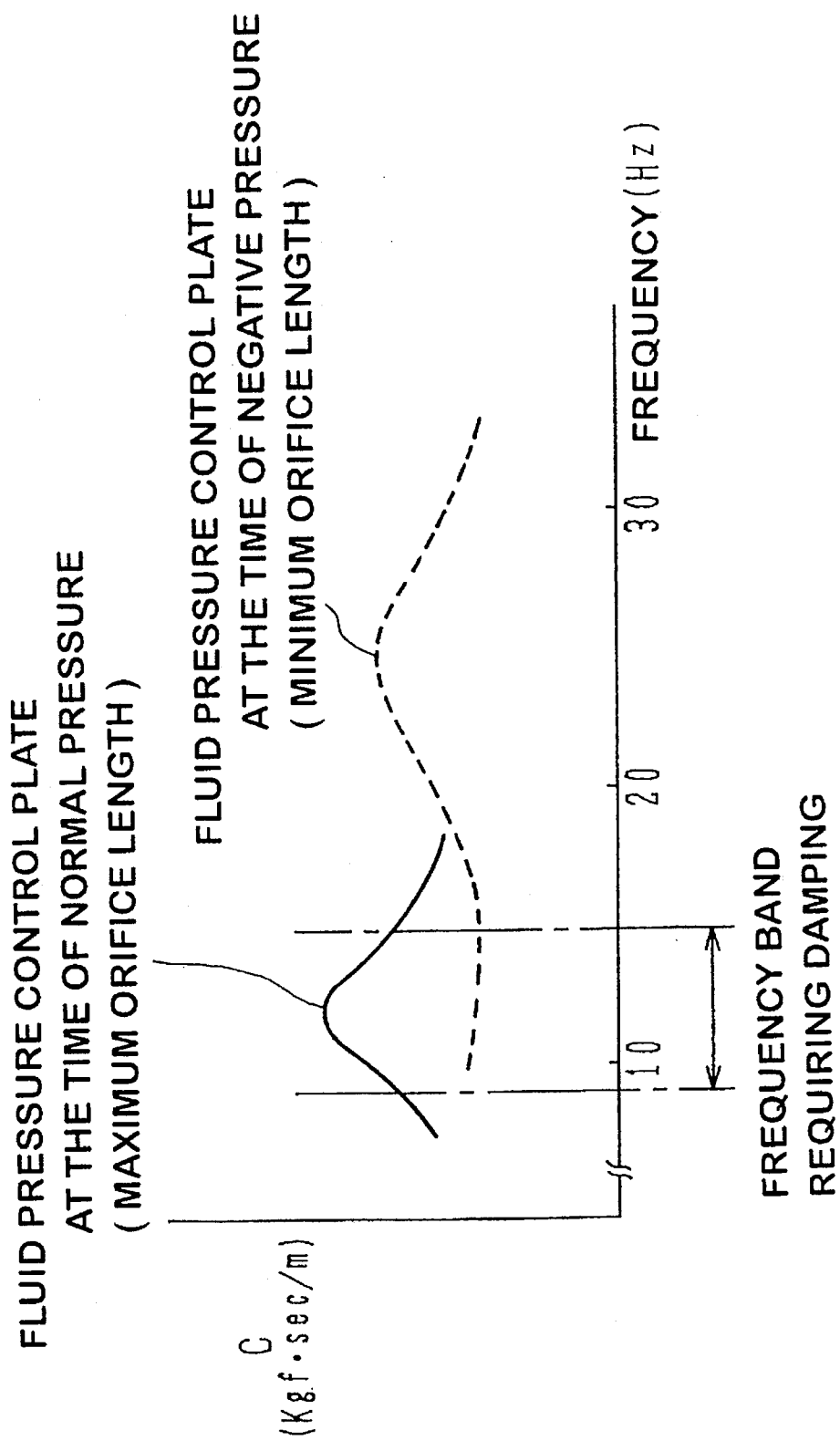
FIG. 5 is graphs showing characteristics in a low-frequency range according to the first embodiment.

In FIG. 5, a horizontal line shows the frequency of input vibrations and a vertical line shows the vibration-damping amount C, wherein the low-frequency vibration range of 9–15 Hz is the range of input vibrations which requires the vibration-damping. When the displacement of the movable wall portion 12 is controlled as shown in a broken line, as the resonance point moves further to the high-frequency side, it is apparent that the proper damping can not be obtained.

Next, in the idling vibrations in a frequency range of 20–30 Hz, as it is necessary to remarkably reduce the dynamic spring rate, the control chamber 26 is kept under a negative pressure by connecting it to the negative pressure source through the control valve 28. In this case, the displacement of the movable wall portion 12 is controlled and the substantial orifice length is minimized (see FIG. 4). Accordingly, as is apparent from FIG. 6, it is possible to set the minimum value of the dynamic spring rate to this range and remarkably reduce the dynamic spring rate.

Figure 6:
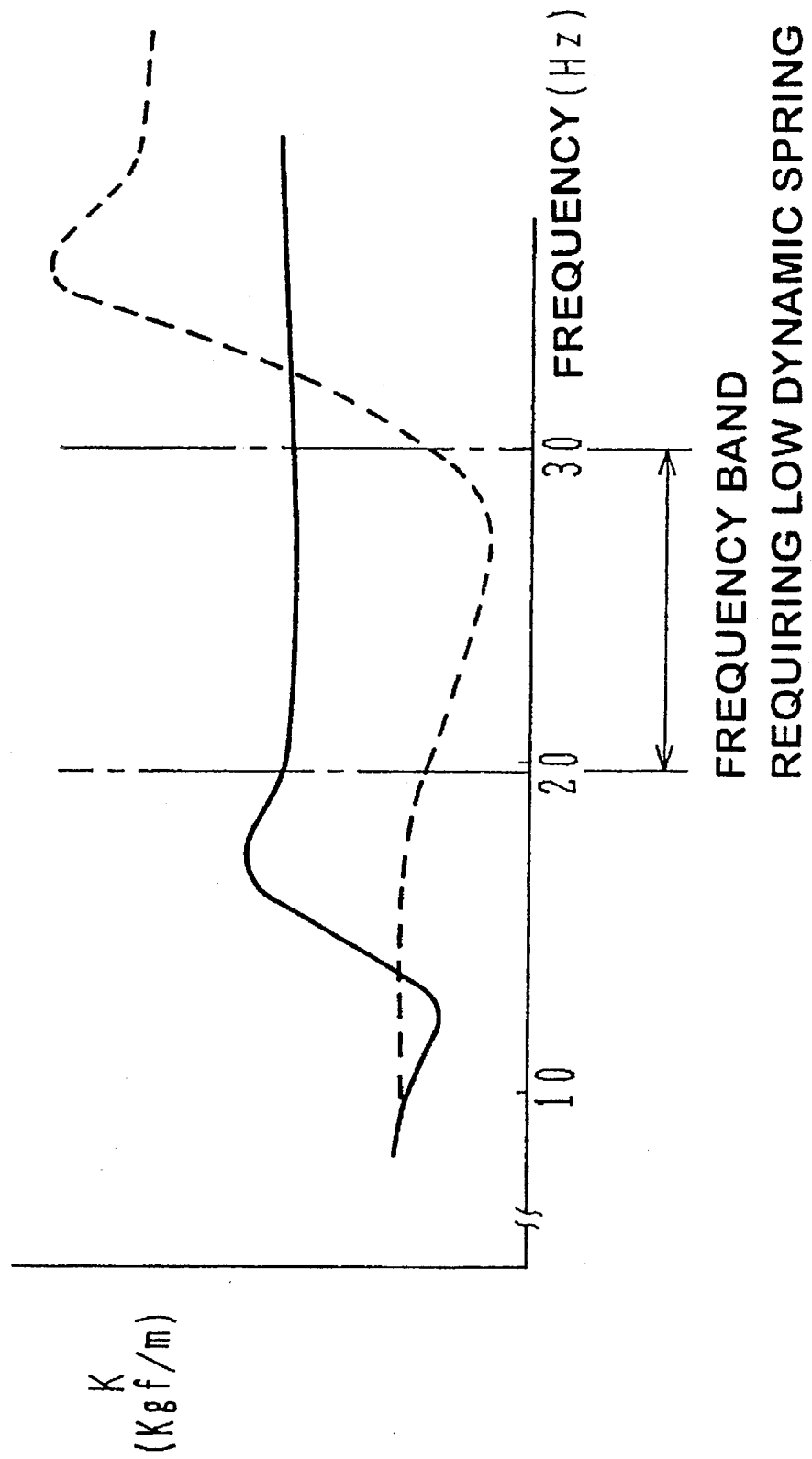
FIG. 6 is graphs showing characteristics in an idling range according to the first embodiment.

In FIG. 6, a horizontal line shows the frequency of input vibrations and a vertical line shows the dynamic spring constant K. When the displacement of the movable wall portion 12 is not controlled as shown in a solid line, the minimum value of the dynamic spring rate moves further to the low frequency side. In this case, it is not possible to get the desired characteristic even if a low dynamic spring rate is necessary in the idling vibrations in a frequency of 20–30 Hz. On the other hand, when the displacement of the movable wall portion 12 is controlled as shown in a broken line, it is apparent that the resonance point moves to a high frequency side to get a proper vibration-damping.

Furthermore, once the deformation control portion 14 contacts the case outer member 15 by the displacement control of the movable wall portion 12, the movable wall portion 12 is controlled not to effect further displacement. The absorption of the internal pressure by the elastic deformation of the movable wall portion 12 is also reduced and it is therefore possible to maximize the generation of vibration-damping.

When the vehicle is running at a constant speed, the low dynamic spring rate is required for the input vibration range of higher than 30 Hz. In this case, when the control chamber 26 is kept under normal pressure, since the elastic deformation of the movable wall portion 12 can be effected comparatively freely, the internal pressure generated by the vibrations of the engine is partially absorbed by the movable wall portion 12 and as a result, it is possible to realize the low dynamic spring condition.

Figure 7:
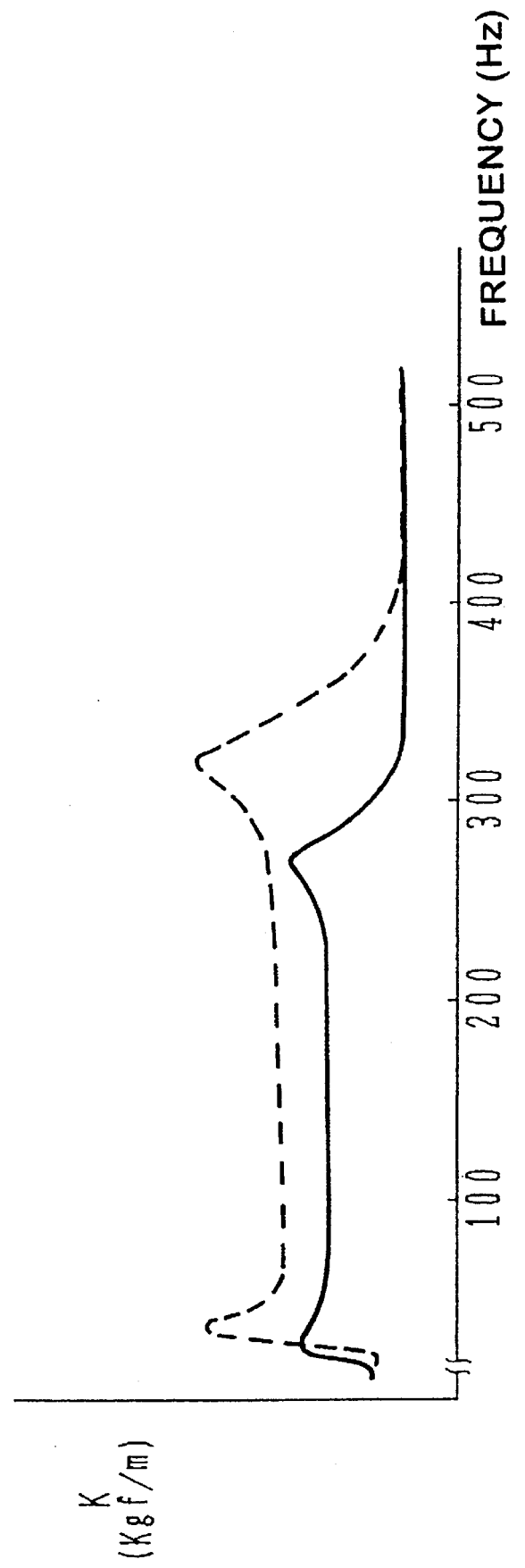
FIG. 7 is graphs showing characteristics during running of an automobile vehicle at a constant speed according to the first embodiment.

In FIG. 7, a horizontal line shows the frequency of input vibrations and a vertical line shows the dynamic spring constant K. When the displacement of the movable wall portion 12 is not controlled as shown by a solid line, it is apparent that there is created the low dynamic spring condition. On the other hand, when the displacement of the movable wall portion 12 is controlled as shown by a broken line, the dynamic spring characteristic slightly moves to the side of a high dynamic spring rate. Accordingly, it is more desirable not to control the displacement during running of the vehicle at a constant speed.

According to the present embodiment, it is to be noted that the durability is also remarkably improved. Namely, the movable wall portion 12 is integrally formed with the rubber block 3 to be controlled by the control means provided outside the fluid chamber and also the passage length adjustable valve 38 is integrally formed with the movable wall portion 12. Since whereby since the working fluid within the first chamber 8 only contacts the movable wall portion 12, it is not necessary to provide a special sealing therebetween.

It is not necessary to provide mechanically slidable portions which are easily worn away. Since the working fluid is not a special magnetic fluid, it is possible to remarkably reduce the property change resulting from the environmental change for usage such as temperature for the more reliable assurance of performance.

Furthermore, the fluid resistance during the displacement of the movable wall portion 12 is reduced and the displacement control by the negative pressure is facilitated. Even when the displacement is controlled by such an electric means as described below, the dissipation power is less than the mechanical control. Accordingly, as the internal pressure control mechanism can be simplified, it is possible to make the entire mechanism simple and reduce the number of parts used to lower the cost.

When the outside of the movable wall portion 12 is covered by the rigid case outer member 15 and the movable wall portion 12 is provided at a part thereof with a thick deformation control portion 14 to project toward the case outer member 15, it is possible to change the dynamic spring constant by letting the deformation control portion 14 approach the case outer member 15 or by keeping the deformable control portion 14 from the case outer member 15. It is also possible not only to exhibit a nonlinear spring characteristic corresponding to the magnitude of the input vibrations and improve the durability of the movable wall portion 12, but also to control the displacement amount when the movable wall portion 12 is displaced.

Furthermore, when the movable wall portion 12 is formed in the plane generally parallel to the main input direction Z of the vibrations to be isolated, the arrangement of the movable wall portion 12 and the control means is facilitated.

Figure 8:
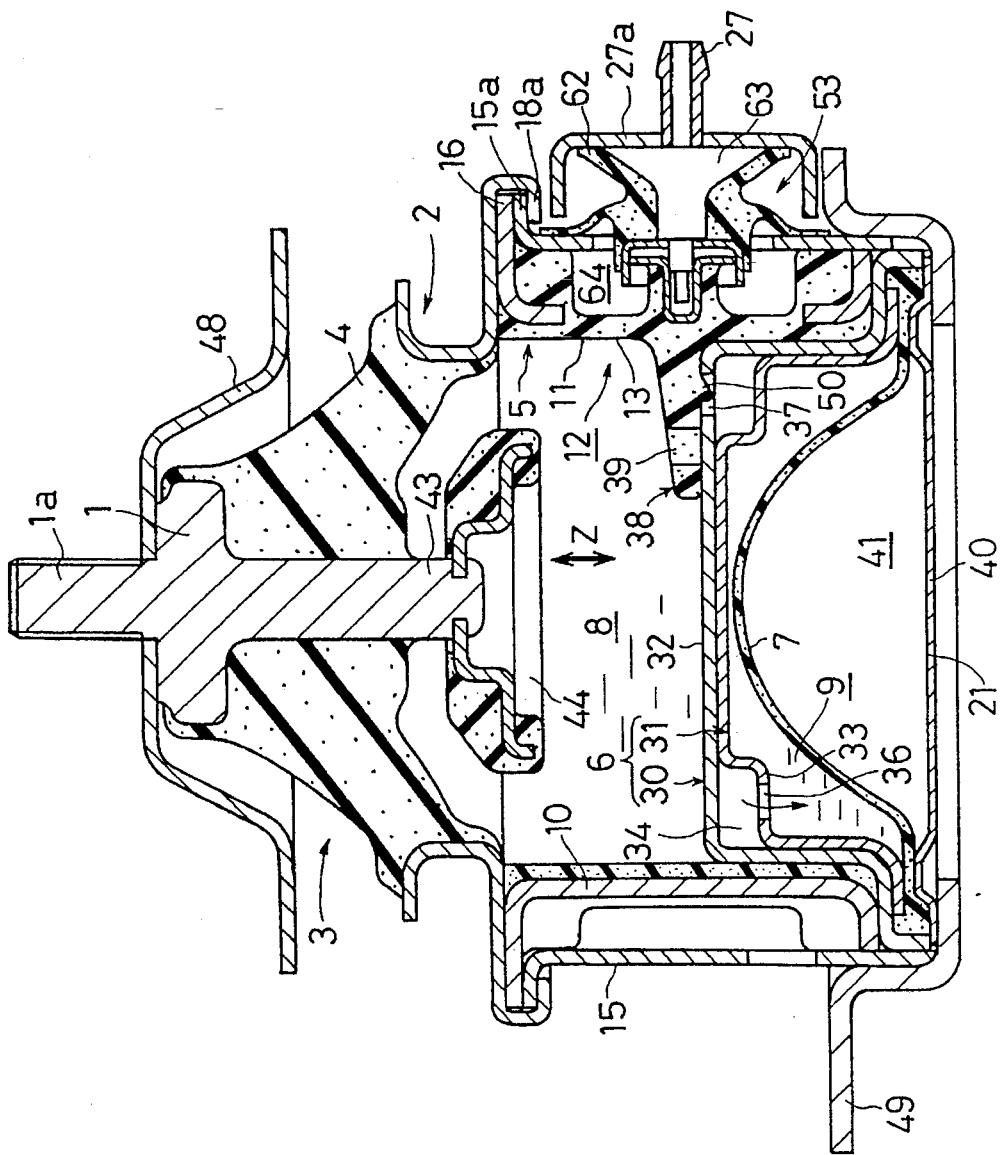
FIG. 8 is a view corresponding to FIG. 1 of a second embodiment.
Figure 9:
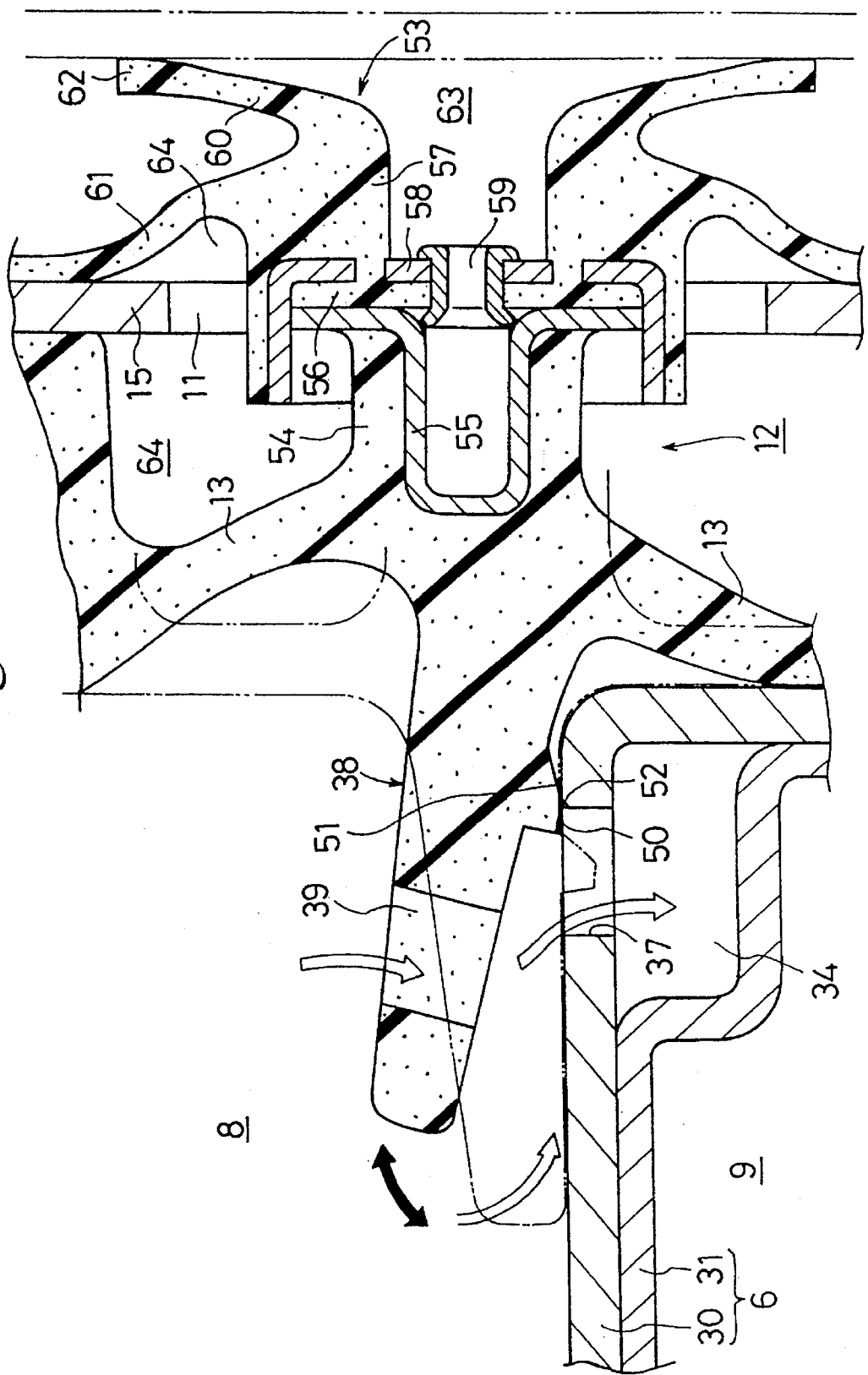
FIG. 9 is an enlarged sectional view of an essential part of the second embodiment.

Now, a second embodiment of the present invention will be described referring to FIGS. 8 and 9. In the present embodiment, the mechanism of the passage length adjustable valve is only modified and the rest remain substantially the same. Accordingly, the functional portions common to the previous embodiment are given the same reference numerals (this also applies to the other embodiments). FIG. 8 is a view similar to FIG. 1 and FIG. 9 is an enlarged view of an essential part.

As is apparent from these figures, the passage length adjustable valve 38 according to the present embodiment is integrally provided with a projection 50 which is adapted to engage with the inside of the intermediate opening portion 37 when the intermediate opening portion 37 is closed by the passage length adjustable valve 38. The projection 50 is provided with a slope 51 which is inclined in the direction of the forward and backward movement of the passage length adjustable valve 38 and arranged such that the height of the projection 50 is gradually lowered outward to be mounted on the opening edge 52 when the passage length adjustable valve 38 is displaced in its opening direction.

The movable wall portion 12 is provided with the passage length adjustable valve 38 and a base portion 53 which is adapted to engage with a hole portion 11 for free forward and backward movement therethrough. The thin portion 13 of the passage length adjustable valve 38 serves as an elastic membrane for covering the chamber side of the hole portion 11. The movable wall portion 12 is integrally provided at its peripheral center portion with a projection 54 facing the hole portion 11 which is located outward in the direction of the forward and backward movement of the passage length adjustable valve 38 and the projection 54 is integrally formed with a core metal fitting 55.

The passage length adjustable valve 38 is united by a rivet 59 with a cup-shaped core metal fitting 58 which is integrally formed with the central thick portion 57 on the side of the base portion 53, at the core metal fitting 55 through the rubber layer 56. The rubber layer 56 is integrally formed with the central thick portion 57.

The base portion 53 is integrally provided with a cylindrical portion 60 with an open end which projects outward in the direction of the forward and backward movement of the passage length adjustable valve 38 and a thin membrane portion 61 which extends in the plane direction substantially perpendicular to the passage length adjustable valve 38.

The cylindrical portion 60 is arranged such that its projecting end 62 closely contact in an air-tight manner the inner surface of a cup-shaped securing base 27a for a negative pressure pipe 27 to form therein a negative pressure chamber 63 which communicates with the negative pressure pipe 27. The securing base 27a, although not apparent from FIG. 8, is secured to the outer wall surface of the case outer member 15.

The thin membrane portion 61 is arranged such that its top end closely overlaps the outer wall surface of the case outer member 15 to form an equilibrium chamber 64 between the thin portion 13 and itself to surround the hole portion 11. The pressure within this equilibrium chamber 53 is kept balanced with the atmospheric pressure through the thin membrane portion 61.

As is apparent from FIG. 8, the case inner member 10 and the case outer member 15 are arranged to overlap each flange 16 and 15a and are united by clamping the lower end 18a of the connecting member 2. The lower ends of the case outer member 15 and the partition wall 6 are secured in an upwardly opening cup-shaped bracket 49 by a press fit.

Next, the operation of the second embodiment will be described. When the negative pressure chamber 63 is controlled to have the negative pressure through the negative pressure pipe 27, the movable wall portion 12 displaces outward and at the same time, the passage length adjustable valve 38 integrally formed with the movable wall portion 12 also displaces outward to effect the valve opening motion.

In this case, as is apparent from FIG. 9, the projection 50 is mounted on the opening edge portion 52 since the slope 51 moves while contacting the opening edge portion 52, while the passage length adjustable valve 38 is separated upward from contact with the partition wall 6. The top end of the passage length adjustable valve 38 is widely opened upward since the passage length adjustable valve 38 is raised by utilizing the projection 50 as a fulcrum.

Thus, the passage length adjustable valve 38 can surely leave the intermediate opening portion 37 open and the fluid within the first chamber 8 can smoothly flow into the intermediate opening portion 27 through the communication opening 39 of the passage length adjustable valve 38 and from between the passage length adjustable valve 38 and the partition wall 6.

Accordingly, since the opening and closing motion of the passage length adjustable valve 38 can be steadily effected only by applying a smaller power from the outside, it is possible to attain both operational reliability and a more compact device at the same time.

Moreover, in the present embodiment, the equilibrium chamber 64 is kept balanced to the atmospheric pressure by the thin membrane portion 61. Accordingly, even if the negative pressure pipe 27 is not opened to the atmospheric pressure, when the internal pressure within the first chamber 8 rapidly increases, it is possible to absorb such pressure by the elastic deformation of the thin portion 13 and the thin membrane portion 64.

It is to be noted that the communication opening 39 formed in the passage length adjustable valve 38 may not necessarily be provided and may be omitted if the height of the projection 50 can be adjusted to have a proper measurement.

Figure 10:
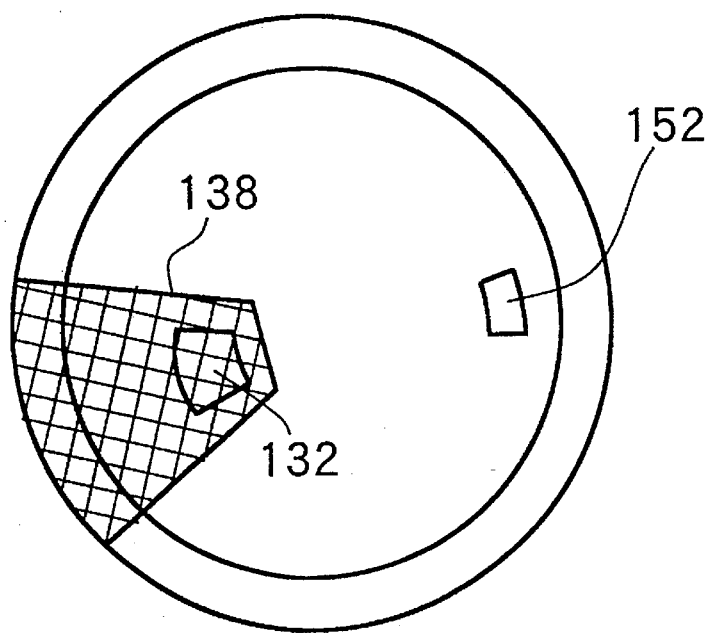
FIG. 10 is a front view of a partition wall according to a third embodiment.
Figure 11:
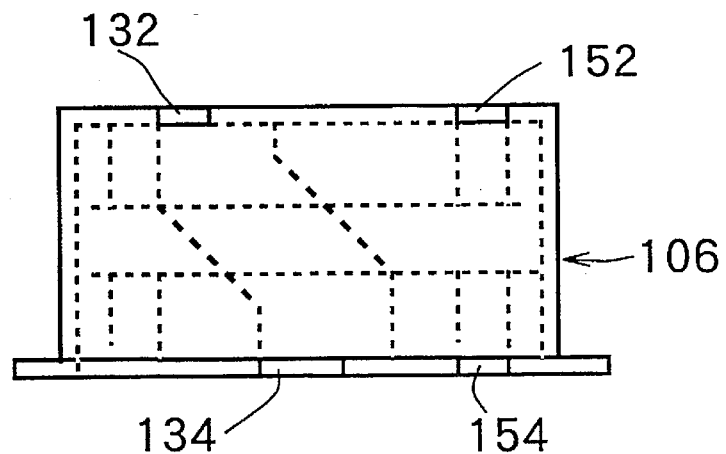
FIG. 11 is side view of the partition wall according to the third embodiment.
Figure 12:
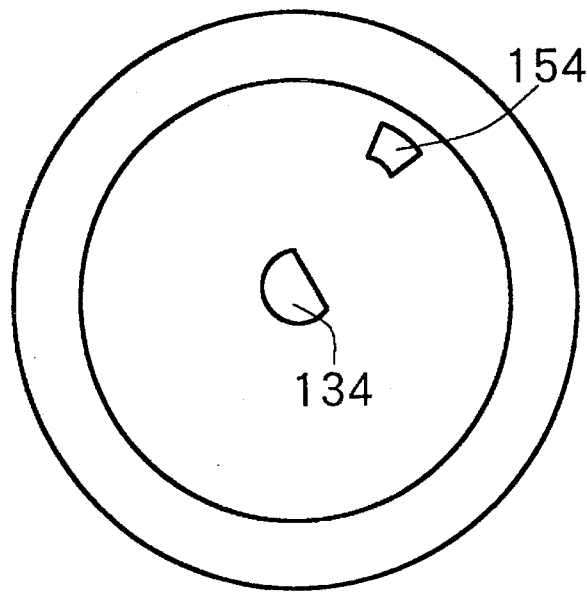
FIG. 12 is bottom plan view of the partition wall according to the third embodiment.
Figure 13:
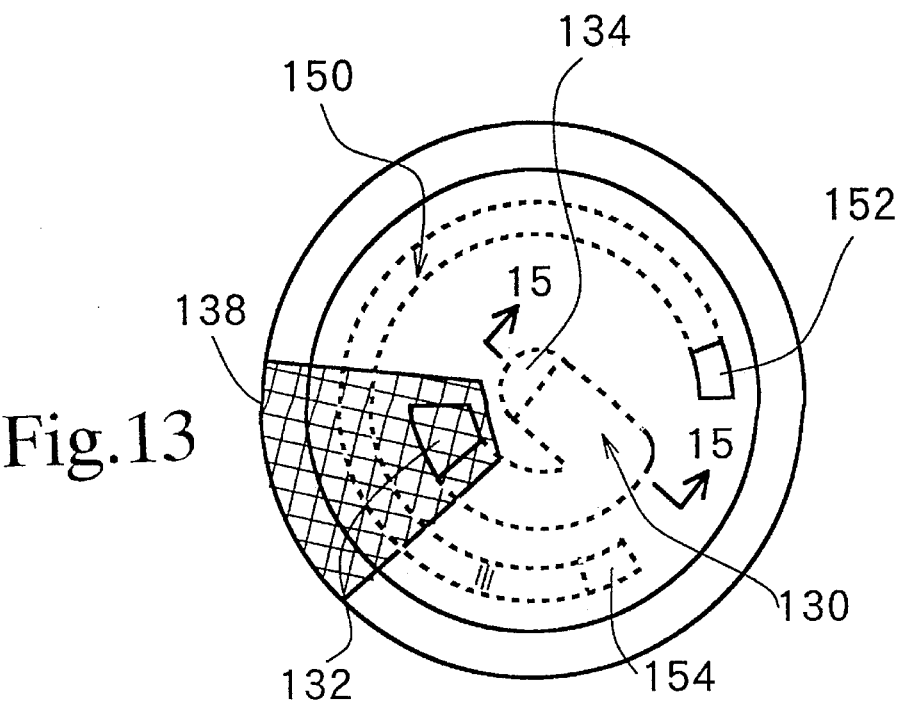
FIG. 13 is a view corresponding to FIG. 3 of the third embodiment.
Figure 14:
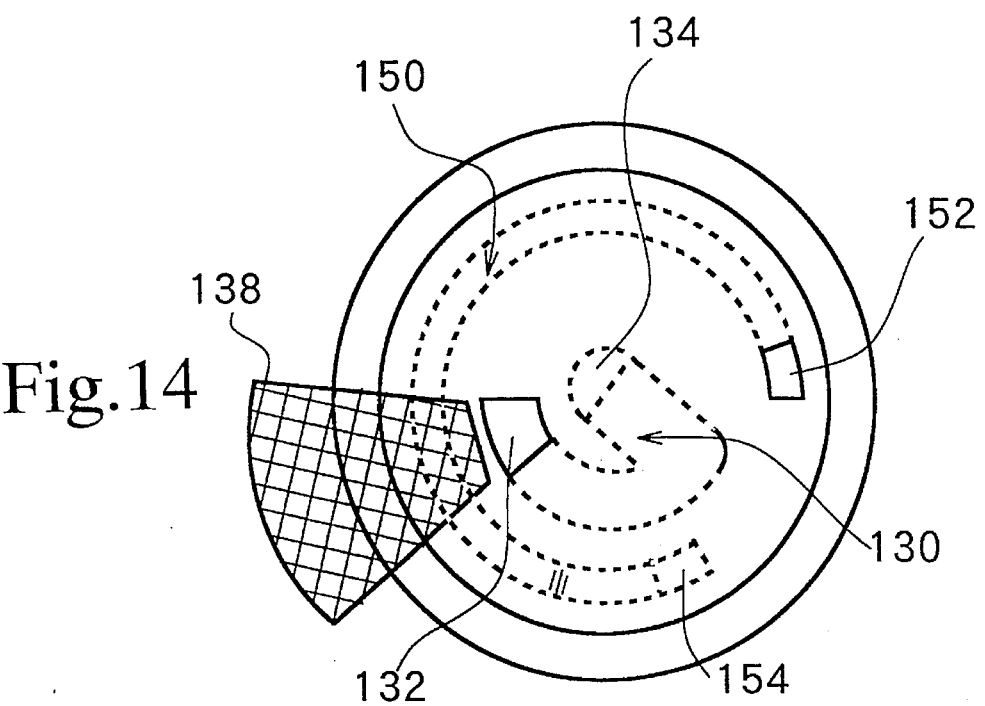
FIG. 14 is a view corresponding to FIG. 4 of the third embodiment.
Figure 15:
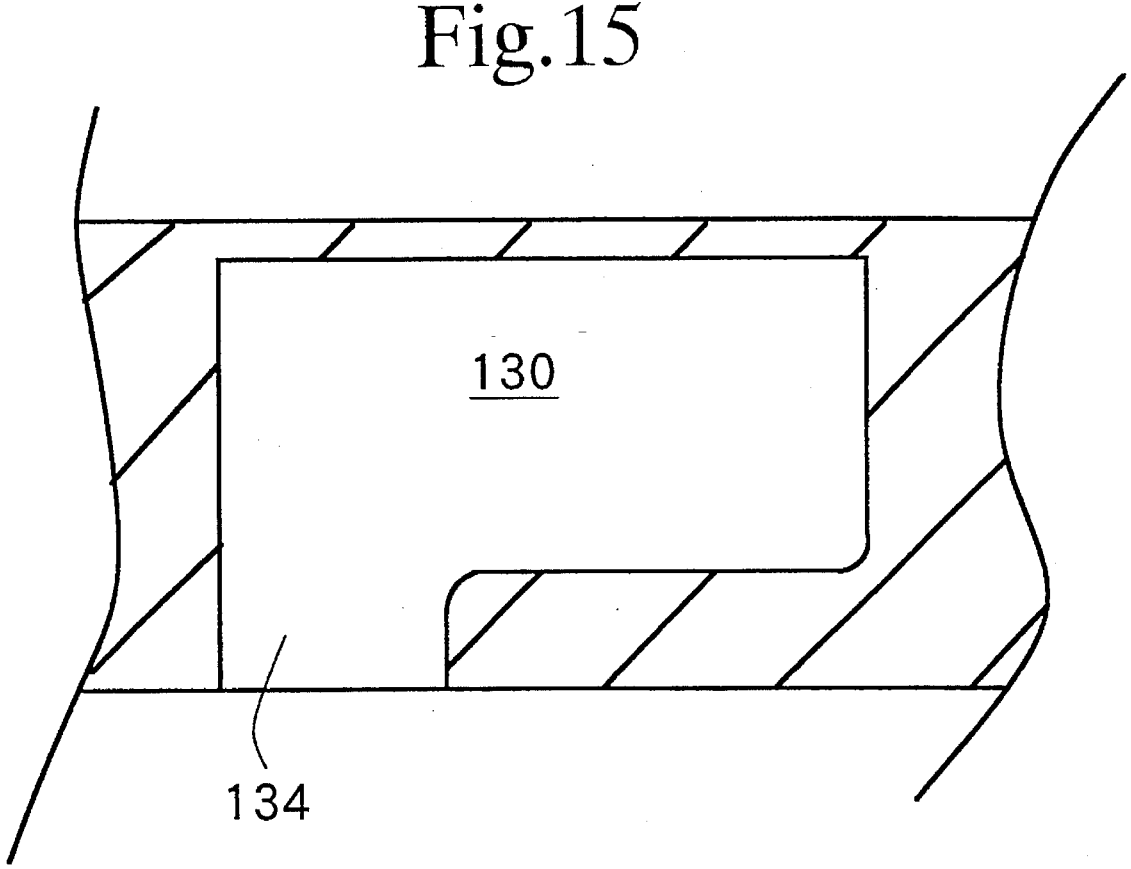
FIG. 15 is a cross-sectional view taken along line 15—15 of FIG. 13.

A third embodiment will now be described with reference to FIGS. 10 through 15. FIG. 10 is a front view of a partition wall 106 according to the third embodiment, FIG. 11 is a side elevational view of the partition wall 106 and FIG. 12 is a bottom plan view of the partition wall 106, respectively. FIG. 13 is a view corresponding to FIG. 3 of the third embodiment, FIG. 14 is a view corresponding to FIG. 4 of the third embodiment, and FIG. 15 is a cross-sectional view taken along line 15—15 of FIG. 13.

As is apparent from FIG. 10, the partition wall 106 is provided at its upper surface with an idling orifice inlet 132 which is the inlet for an idling orifice 130 and a damping orifice inlet 152 which is the inlet for a damping orifice 150. As is apparent from FIG. 12, there are provided at the bottom surface of the partition wall 106 an idling orifice outlet 134 which is the outlet for the idling orifice 130 and a damping orifice outlet 154 which is the outlet for the damping orifice 150. In the present embodiment, the inlet is formed on the side of the first chamber 8 and the outlet is formed on the side of the second chamber 9 for convenience of the description, but this relation may be reversed.

The idling orifice inlet 132 is adapted to be opened and closed by an adjustable valve 138 which is integrally formed with the partition wall portion 12 (not shown). The adjustable valve 138 has substantially the same external shape as the passage length adjustable valve 38 of the first embodiment, but it only differs from that in that there is not provided the communication opening 39.

As is apparent from FIG. 13, the damping orifice 150 is formed in a circular arc shape in about three quarters of the circumference on the outer periphery of the partition wall 106, while the idling orifice 130 is separately formed in a bent shape on the inner periphery than the damping orifice 150. As apparent from the figure, the passage cross-sectional area of the idling orifice 130 is larger than that of the damping orifice 150, while the passage length of the idling orifice 130 is designed to be shorter than that of the damping orifice 150. Thus, both the orifices have different natural resonance oscillation frequencies from each other.

Next, the operation of the third embodiment will be described. To absorb low-frequency vibrations of 9–15 Hz, the control chamber 26 is kept under normal pressure. Thus, since the idling orifice inlet 132 is in a condition closed by the adjustable valve 138 (see FIG. 13), it is possible to absorb vibrations in a low-frequency range of 9–15 Hz by the action of the damping orifice 150 which has a small passage cross-sectional area and a long passage length.

In idling vibrations of the engine in a frequency range of 20–30 Hz, the control chamber 26 is kept under negative pressure. Thus, since the idling orifice inlet 132 is in the opened condition (see FIG. 14), it is possible to absorb the vibrations in the idling frequency range of 20–30 Hz by the action of the idling orifice 130.

Moreover, in vibrations during running of the vehicle at a constant speed (of higher than 30 Hz), the control chamber 26 is kept under normal pressure. Thus, since the movable wall portion 12 can comparatively freely deform, the internal pressure generated by the engine vibrations are partially absorbed by the movable wall portion 12 and it is possible to realize low dynamic spring characteristics.

It will be understood that the present invention is not limited to the embodiments described above, but may be varied in many ways. For example, the displacement control of the movable wall portion 12 may not be effected by the negative pressure, but may be done by connecting one end of the driving shaft provided on an air cylinder or a solenoid disposed outside to the movable wall portion 12 to let the driving shaft expand and contract from the outside.

Furthermore, the movable wall portion 12 of the third embodiment may be provided with the deformation control portion 14 as shown in the first embodiment and also the adjustable valve 138 may be provided with a projection which engages with the inside of the idling orifice inlet 132 as shown in the second embodiment.

What is claimed is:

1. A fluid sealed type antivibration rubber device comprising:

a first connecting member secured to one of a vehicle body and a vibrating member;

a second connecting member secured to the other of the vehicle body and the vibrating member;

a rubber block disposed between the first and second connecting members, the first and second connecting members being adapted to form a closed space therebetween with at least a part of the rubber block;

a partition member dividing the closed space into a plurality of fluid chambers and an orifice passage provided to place the plurality of fluid chambers in communication with each other;

wherein the first or second connecting member includes a wall portion, the inside being covered by a rubber wall being contiguous with the rubber block;

the wall portion of the first or second connecting member covered by the rubber wall being provided at a part thereof with an opening portion, and a rubber wall portion corresponding to the opening portion is adapted to serve as a movable wall portion which is elastically deformable away from the opening portion toward one side;

the elastic deformation being effected such that the elastic deformation displacement is controlled by a control means provided outside the device; and wherein the partition member on the side of a first fluid chamber facing the movable wall portion is provided at its surface with a first opening portion which is always open as an opening portion for the orifice passage and an intermediate opening portion which is opened and closed by a passage length adjustable valve;

the passage length adjustable valve being integrally formed with the movable wall portion and projecting toward the center of the partition member so that the movable wall portion can slide on the surface of the partition member, whereby the orifice length is adjustably controlled such that when the intermediate opening portion is closed, the orifice passage is long and when the intermediate opening portion is opened, the orifice passage is short.

2. The fluid sealed type antivibration rubber device according to claim 1, wherein a second opening portion is provided to permit both ends of the orifice passage to always be open to communicate with each fluid chamber, and the intermediate opening portion is provided to open in the middle of the orifice passage to communicate with one of the fluid chambers, wherein the displacement of the movable wall portion allows the passage length adjustable valve to open and close the intermediate opening portion to adjust the length of the orifice passage.

3. The fluid sealed type antivibration rubber device according to claim 1, wherein the control means is an external air control device which controls the displacement of the movable wall portion by negative pressure from the one side.

4. The fluid sealed type antivibration rubber device according to claim 3, wherein to control the displacement of the movable wall portion by the negative pressure from the one side serving as the control means, the one side of the movable wall portion is covered with predetermined space left by a rigid case member, and the movable wall portion is provided at a part thereof with a thick deformation control portion projecting toward the case member.

5. The fluid sealed type antivibration rubber device according to claim 1, wherein the passage length adjustable valve is adapted to slidably move on the partition member, and a slidably moving portion thereof is provided with a projection which engages with the intermediate opening portion when the passage length adjustable valve is in a valve closing condition and which mounts on an opening edge of the intermediate opening portion when the passage length adjustable valve is in a valve opening condition to raise the passage length adjustable valve to separate from the partition member.

6. The fluid sealed type antivibration rubber device according to claim 5, wherein the projection is formed with a slope to help it mount on the opening edge of the intermediate opening portion.

7. A fluid sealed type antivibration rubber device comprising, a first connecting member secured to one of a vehicle body and a vibrating member;

a second connecting member secured to the other of the vehicle body and the vibrating member:

a rubber block disposed between the first and second connecting members, the first and second connecting members being adapted to form a closed space therebetween with at least a part of the rubber block;

a partition member dividing the closed space into a plurality of fluid chambers;

a first orifice passage provided to place the plurality of fluid chambers in communication with each other; and a second orifice passage is provided to communicate with each fluid chamber, wherein the first or second connecting member includes a wall portion, the inside being covered by a rubber wall being contiguous with the rubber block;

the wall portion of the first or second connecting member covered by the rubber wall being provided at a part thereof with an opening portion, and a rubber wall portion corresponding to the opening portion is adapted to sersave as a movable wall portion which is elastically deformable away from the opening portion toward one side;

the elastic deformation being effected such that the elastic deformation displacement is controlled by a control means provided outside the device; and wherein the partition member on the side of a first fluid chamber facing the movable wall portion is provided at its surface with a first opening portion which is always open as an opening portion for the first orifice passage and a second opening portion which is opened and closed by a passage length adjustable valve;

the passage length adjustable valve being integrally formed with the movable wall portion and protecting toward the center of the partition member so that the movable wall portion can slide on the surface of the partition member, wherein the second orifice passage is shorter than the first orifice passage and is capable of communicating or stopping the communication with each fluid chamber by opening and closing the second opening portion by the passage length adjustable valve.

8. The fluid sealed type antivibration rubber device according to claim 7, wherein the control means is an external air control device which controls the displacement of the movable wall portion by negative pressure from the one side.

9. The fluid sealed type antivibration rubber device according to claim 8, wherein to control the displacement of the movable wall portion by negative pressure from the one side serving as the control means, the one side of the movable wall portion is covered with the predetermined space left by a rigid case member and the movable wall portion is provided at a part thereof with a thick deformation control portion projecting toward the case member.

10. The fluid sealed type antivibration rubber device according to claim 7, wherein the passage length adjustable valve is adapted to slidably move on the partition wall, and a slidably moving portion thereof is provided with a projection which engages with an outlet or inlet of the second orifice passage when the passage length adjustable valve is in a valve closing condition and which mounts on the opening edge of the outlet or inlet of the orifice passage second when the passage length adjustable valve is in a valve opening condition to raise the passage length adjustable valve to separate from the partition member.

11. The fluid sealed type antivibration rubber device according to claim 10, wherein the projection is provided with a slope to help it mount on the opening edge of the outlet or inlet of the second orifice passage when the passage length adjustable valve is in a valve opening condition.

* * * * *